United States Patent Office 3,341,356
Patented Sept. 12, 1967

3,341,356
TREATED GLASS FIBERS AND METHODS FOR TREATING GLASS FIBERS TO IMPROVE THE BONDING RELATION WITH EPOXY RESINS
Theodore J. Collier, Chillicothe, Ohio, assignor to Owens-Corning Fiberglas Corporation, a corporation of Delaware
No Drawing. Original application Dec. 8, 1954, Ser. No. 474,007. Divided and this application Mar. 16, 1962, Ser. No. 180,362
6 Claims. (Cl. 117—126)

This is a division of my copending application Ser. No. 474,007, filed Dec. 8, 1954, now abandoned, and entitled, "Treated Glass Fibers and Methods for Treating Glass Fibers To Improve the Bonding Relation With Epoxy Resins."

This invention relates to glass structures, such as glass fibers and thin flexible films of glass, in which the surface characteristics of the glass structure have been modified to enable a strong bonding relation to be established between the glass surfaces and resinous materials, particularly epoxy resins.

The difficulties confronted in the establishment of a strong and permanent bonding relationship between the surfaces of glass structures, such as glass fibers, and resinous materials have, in general, become well recognized in the art. Because of the non-porous character of glass fibers, as distinguished from the high degree of porosity available in natural fibers such as the cellulose fibers, wool, cotton, hemp and the like, penetration of resinous materials into the fibers is not available for use in establishing a bonding relationship between such glass fibers and resinous materials. Because glass fibers naturally form into elongate rods having perfectly smooth surfaces, as distinguished from the rough surface characteristics of the natural fibers, a gripping relationship cannot be established between applied resinous materials and the glass fiber surfaces. Thus physical anchorage of the type relied upon chiefly for the establishment of a bonding relation between natural fibers and resinous materials is not capable of being developed with glass fibers or other glass structures. Glass fibers and thin flexible glass films cannot be etched or roughened to present a surface by which a desired physical attachment can be established with resinous materials.

In the absence of the ability to make use of physical forces in bonding, it becomes necessary to rely upon the development of a bonding relationship which makes use of chemical forces or physical-chemical forces based upon molecular or ionic attraction and the like. With synthetic resinous fibers, a strong bonding relationship can be developed with the smooth surfaces because such fibrous materials are resinophilic in character and therefore are preferentially receptive to resinous treating materials. In addition, the resinous materials of which the fibers are formed have the ability of being softened by heat or solvent in a manner to enable the development of a desired bonding relationship with the applied treating material. Such chemical forces or such softening of the surfaces are not available with glass fibers because the glass fibers are inert to heat and solvents and because the glass fiber surfaces are dominated by groups that are hydrophilic in character and therefore receive moisture in preference to resinous materials. As a result, only a weak bonding relationship is capable of being established in the first instance and even this limited bonding is reduced in the presence of moisture or high humidity sufficient to cause a moisture film to form and separate the resinous coating from the glass fiber surfaces.

When a strong bonding relationship cannot be established between the glass fibers and resinous materials used in combinations therewith, maximum utilization of the strength properties of the glass fibers cannot be made available in the products that are formed. Even where a fair bonding relationship between glass and resin can be established under dry conditions, the strength properties of the glass fiber reinforced plastic or coated fabric depreciate greatly under high humidity conditions or in the presence of moisture.

Thus it is an object of this invention to produce glass fibers and to provide a method for producing glass fibers treated with a material to enable the development of a strong bonding relationship between the glass fiber surfaces and resinous materials.

More specifically, it is an object of this invention to treat glass fibers with an anchoring agent that is capable of establishing a strong bonding relationship between the surfaces of the glass and epoxy type resins often used in combinations with glass fibers in the manufacture of coated and reinforced structures.

Use has been made of anchoring agents containing groupings through which the agent may be integrated or strongly bonded to the glass fiber surfaces to modify the characteristics thereof while other groups contained in the anchoring agent are capable of development of a strong bonding relationship with the resinous materials thereby to tie in the resinous material with the glass fiber surfaces. In one group of such materials described in the Steinman Patent No. 2,552,910, use is made of a Werner complex compound in which the acido group coordinated with the trivalent nuclear chromium atom is formed with less than 6 carbon atoms and contains a highly functional group, such as unsaturated carbon to carbon linkage capable of addition polymerization. Representative of such anchoring agent is the compound methacrylato chromic chloride. The trivalent nuclear chromium atom is capable of coordination with groupings existing on the glass fiber surfaces to establish a strong bonding relation therewith while the highly functional group, such as the unsaturated carbon to carbon linkage in the acido group, is capable of integration or orientation with groupings contained in the resinous material formed by polymerization through ethylenic groups, such as in the manufacture of unsaturated polyester resins.

Another type of anchoring agent capable of use to improve the bonding relationship between resinous materials and glass fiber surfaces comprises the organo silicon compounds in which an organo group attached directly to the silicon atom is formed with less than 6 or 7 carbon atoms and contains a highly functional group, such as an unsaturated carbon to carbon linkage capable of addition polymerization. Vinyltrichlorosilane is representative of an anchoring agent of the type described. With such materials, a strong bonding relationship appears to result between the silicon oxides of the silane and the silicon oxide groups in the glass fibers while the unsaturated organic group is receptive to similar groups contained in the resinous material, such as are formed by addition polymerization.

As described in the Steinman Patent No. 2,563,289, a strong bonding relationship between a resinous material and glass fiber surfaces can be developed independent of an anchoring agent when the resinous material contains free basic amine groups capable of reaction to form quaternary ammonium compounds or cationic active groups. Such amine polymers are capable of becoming attached to the glass fiber surfaces through groups contained in the glass fiber surfaces and the basic nitrogen atom of the resinous polymer.

While the described systems improve the bonding relation between glass fibers and certain resinous polymers, preferably resinous materials formed by addition polymerization through ethylenic groups, such anchoring agents have been incapable of developing the desired bonding relation between glass fibers or other glass surfaces and the more recently developed epoxy resins which are combined with glass in the manufacture of various structures.

It has been found, in accordance with the practice of this invention, that a strong bonding relation can be developed between such epoxy resins and glass surfaces when use is made of an anchoring agent in the form an organo silicon compound in which the organic group attached directly to the silicon atom of the silane contains a free amine or a compound capable of reacting as an amine, either in an aliphatic or in an aromatic group.

It is believed that the organo silane is capable of attachment to groups existing on the glass surfaces, by the mechanism referred to previously, and that the amine present in the organic groups attached to the silicon atom are capable of attachment, either by reaction or coordination with groupings existing in the epoxy resins thereby to tie in the epoxy resin with the glass surface. By way of illustration, use may be made of such compounds as gamma-aminopropyltriethoxy silane, having the following formula:

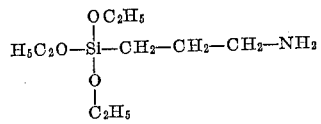

para-aminophenyltrihydroxy silane, having the following structural formula:

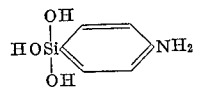

aminoethyltriacetoxy silane, having the following general formula:

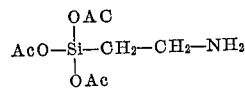

By way of further modification, instead of the amine group in the organic group on the silane, use may be made of an organic group containing an epoxy group

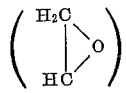

These anchoring agents having epoxy groups are capable of reaction for attachment with epoxy resins while the other functions of the molecule are able, as previously described, of effecting attachment to the glass surfaces.

These anchoring agents may be used alone as finishes for glass fibers and the surfaces of glass films and the like or they may be used in size compositions in combination with other film forming materials and ingredients employed in sizes for glass fibers. When formulated into a size composition, it is desirable to make use of the silane in concentrations ranging from 0.05–2.0 percent by weight of the treating composition. When employed alone in finishes, the concentration of anchoring agent in the treating composition is preferably maintained within the range of 0.1–2.0 percent by weight of the silane. Improved anchorage of epoxy resins is observed when the glass surfaces are treated with a composition containing as little as 0.005 percent by weight of the anchoring agent. More than 8 percent by weight concentration of the anchoring agent in a size composition or in finishes does not provide additional improvements which would compensate for the increased cost.

These anchoring agents may be formulated into treating compositions containing the desired concentrations in solvent systems but it is preferred to make use of an aqueous medium for dilution from the standpoint of cost and ease of application and from the standpoint of safety in the treating process as well as improvement in the curing rate, especially when applied to glass fibers in forming.

The following are illustrative of compositions embodying features of this invention for treatment of glass fibers and films of glass to improve the bonding relation with epoxy resins:

SIZE COMPOSITIONS

Example 1

| | Percent by wt. |
|---|---|
| Polyvinyl acetate (film former) | 2.5 |
| Gamma-aminopropyltriethoxy silane | 0.42 |
| Amine lubricant | 0.25 |
| Water | Remainder |

The size composition is formulated by dissolving the gamma-aminopropyltriethoxy silane in about two-thirds of the required water. The amine lubricant is diluted with about twice its weight of water and acidified to a pH of about 4.5 with acetic acid. The remainder of the water is used to dilute the polyvinyl acetate emulsion and the lubricant and polyvinyl acetate are then added to the solution of the anchoring agent and the mixture is adjusted to a pH of 4.5.

Example 2

| | Percent by wt. |
|---|---|
| Buna S film former | 2.5 |
| Tetraethylene pentamine stearic acid condensation product solubilized with acetic acid lubricant | 0.15 |
| Para-aminophenyl trihydroxysilane | 0.5 |
| Water | Remainder |

Example 3

| | |
|---|---|
| Polyvinyl acetate film former | 2.5 |
| Aminoethyltriacetoxy silane | 0.75 |
| Amine lubricant | 0.3 |

GLASS FINISHES

Example 4

| | |
|---|---|
| Gamma-aminopropyltriethoxy silane | 1.0 |
| Water | Remainder |

The size compositions and finishes are best employed at pH's between 4 and 6. Where the pH must be raised to the desired level as in the formulations containing acetoxy silanes or chromic chloride complexes, use may be made of ammonia or other equivalent amine and where the pH must be lowered, as in Example 1, and in some of the other examples, use may be made of acetic acid or equivalent acidic medium.

When applied to the glass fibers in forming or otherwise after an original size, which might have been applied, has been removed, the size compositions can be applied by conventional means such as by a roll applicator, flannel pad or gathering wheel or shoe when application is made to the glass fibers in forming. When used as a finish, the composition of Example 4 can be applied either by a dip process, a flow-coat process or by means of a padder brush or the like conventional coating means, many of which are well known in the art.

The size or finish may be allowed to air dry on the glass fiber surfaces or other glass surfaces but in order for the development of maximum effectiveness of the compound as an anchoring agent, it is preferred to heat the applied coating to a temperature within the range of 200–250° F. for a short period of time, such as from 3–15 minutes.

In addition to the improvement in the bonding relation achieved between epoxy resins and glass surfaces, anchoring agents of the type described have also been found to be effective for improving the bonding relation between such glass surfaces and other resinous materials such as phenol formaldehyde resins, urea formaldehyde resins, melamine formaldehyde resins and the like amino aldehyde resins and polyester resins.

For development of maximum bonding, it is preferred to make use of anchoring agents of the type described in which the amine and epoxy groups are contained in organic groups having less than 7 carbon atoms in aliphatic arrangement.

It will be understood that changes may be made in the details of the formulations, the materials with which the anchoring agents are combined for use as a size or a finish on the glass fiber surfaces or surfaces of thin flexible glass films, and that changes may also be made in the methods of application and treatment, without departing from the spirit of the invention, especially as defined in the following claims.

I claim:

1. Glass fibers and a coating on the glass fiber surfaces to improve their bonding relation with condensation polymerization resins in which the coating contains an anchoring agent in the form of an organo silane represented by the formula:

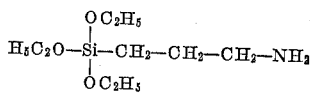

2. Glass fibers and a coating on the glass fiber surfaces to improve their bonding relation with condensation polymerization resins in which the coating contains an anchoring agent consisting of a silane in which an organic group attached to the silicon atom contains a free amine and in which the organic group containing the amine contains less than 7 carbon atoms in aliphatic arrangement.

3. In the method of improving the bonding relation between epoxy resins and glass fibers, the step of coating the glass fibers with a composition containing 0.05 to 5.0 percent by weight of an anchoring agent selected from the group consisting of gamma-aminopropyltriethoxy silane, paraaminophenyltrihydroxy silane and aminoethyltriacetoxy silane.

4. In the method of improving the bonding relation between thermosetting resinous materials and glass structures combined therewith, the steps of coating the surfaces of the glass with a composition containing from 0.05 to 5.0 percent by weight of an anchoring agent in the form of an organo silane in which an organic group attached to the silicon atom contains a free amine and in which the organic group containing the amine contains less than 7 carbon atoms in aliphatic arrangement, and then heating the coated glass to bake the coating at a temperature within the range of 200–250° F.

5. In the method of sizing glass fibers to improve their processing and performance characteristics and to improve their bonding relationship with thermosetting resins, the steps of coating the glass fibers with a size composition containing 0.05 to 5.0 percent by weight of an organo silane in which the organic group attached directly to the silicon atom contains a free amine and which contains less than 7 carbon atoms in aliphatic arrangement, and then drying the coating on the glass fiber surfaces.

6. In the method of finishing glass fibers to improve their bonding relationship with thermosetting resins, the steps of coating the glass fibers with a finish, the solids of which consist essentially of a compound selected from the group consisting of gamma-aminopropyltriethoxy silane, para-aminophenyltrihydroxy silane and aminoethyltriacetoxy silane, and drying the coating on the glass fiber surfaces.

References Cited

UNITED STATES PATENTS

| 2,832,754 | 4/1958 | Jex et al. | 117—126 |
| 2,854,354 | 9/1958 | Gottlieb | 117—126 |
| 2,931,739 | 4/1960 | Marzocchi et al. | 117—126 |
| 2,946,701 | 7/1960 | Plueddeman | 117—126 |
| 2,974,062 | 5/1961 | Collier | 117—126 |
| 2,994,619 | 8/1961 | Eilerman | 117—126 |

FOREIGN PATENTS

| 544,555 | 5/1956 | Belgium. |
| 1,149,677 | 7/1957 | France. |
| 816,056 | 7/1959 | Great Britain. |
| 627,447 | 9/1961 | Canada. |

OTHER REFERENCES

Sidlovsky: Silicones in the Fiber Glass Industry, The Glass Industry, September 1960, pp. 499, 500, 501 and 524.

ALFRED L. LEAVITT, *Primary Examiner.*

R. D. KEVIUS, R. S. KENDALL, P. H. KONDO,
*Examiners.*